United States Patent [19]

McCardle, Jr.

[11] 4,176,792
[45] Dec. 4, 1979

[54] VARIABLE AREA EXHAUST NOZZLE

[75] Inventor: Arthur McCardle, Jr., Greenhills, Ohio

[73] Assignee: General Electric Company, Cincinnati, Ohio

[21] Appl. No.: 814,568

[22] Filed: Jul. 11, 1977

[51] Int. Cl.² .......................................... B64C 15/08
[52] U.S. Cl. .............................................. 239/265.41
[58] Field of Search ................. 239/265.11, 265.19, 239/265.33, 265.35, 265.37, 265.39, 265.41, 265.43

[56] References Cited

U.S. PATENT DOCUMENTS

| | | | |
|---|---|---|---|
| 2,910,828 | 11/1959 | Meyer et al. | 60/35.6 |
| 2,926,491 | 3/1960 | Hyde | 239/265.41 |
| 3,214,904 | 11/1965 | Bailey et al. | 239/265.41 X |
| 3,367,579 | 2/1968 | Mehr | 239/265.41 |
| 3,730,436 | 5/1973 | Madden et al. | 239/265.39 |
| 3,807,637 | 4/1974 | Camboulives et al. | 239/265.41 |

FOREIGN PATENT DOCUMENTS 936044   9/1963   United Kingdom ............... 239/265.41

Primary Examiner—Robert W. Saifer
Attorney, Agent, or Firm—Dana F. Bigelow; Derek P. Lawrence

[57] ABSTRACT

A convergent-divergent exhaust nozzle is provided with a four-bar linkage system which allows effective variation of both the primary nozzle throat and exit areas, as well as movement of the outer nozzle, by movement of a single cam roller assembly. In addition to the convergent and divergent flaps, the linkage system includes a rigid link extending out from the exhaust duct and a compression link pivotally interconnecting the rigid link and the divergent flap. Nozzle area variations are accomplished by rotating the convergent flap about a pivot attached to the exhaust duct, with the divergent flap and the outer nozzle flap being moved accordingly. The desired nozzle throat/exit area ratio relationship can be appropriately established by proper selection of the lengths of the individual links and location of their connection points. Provision is made to readily change the length of one of the links to thereby modify the area ratio schedule as desired.

14 Claims, 5 Drawing Figures

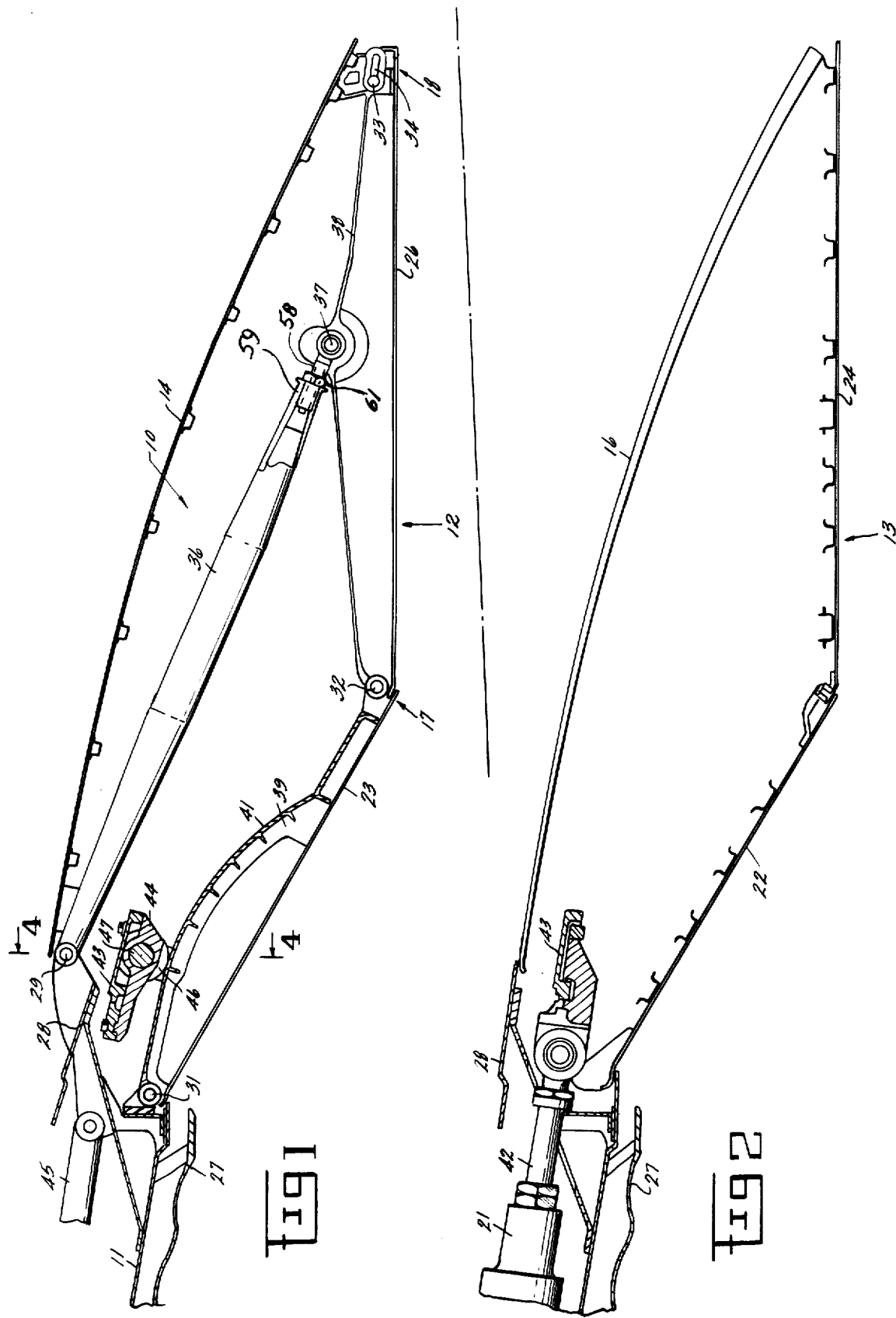

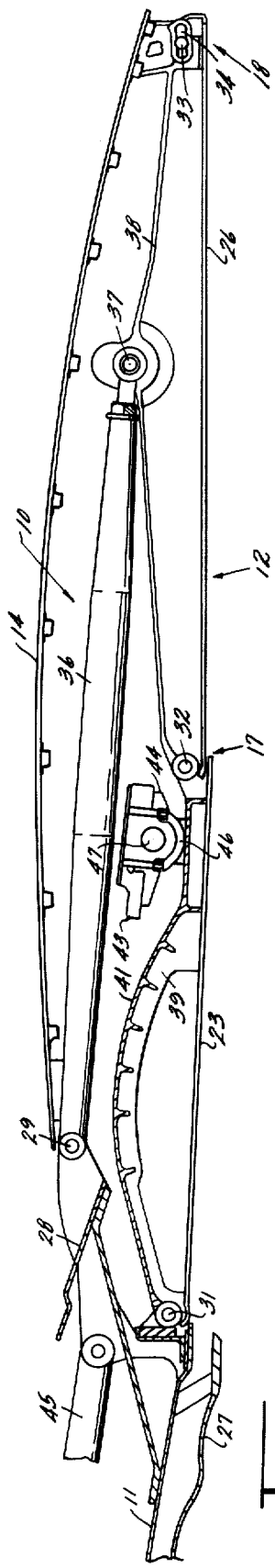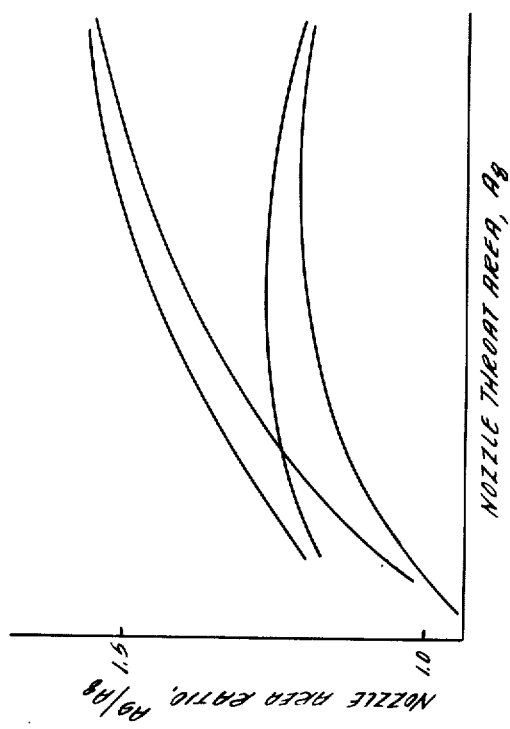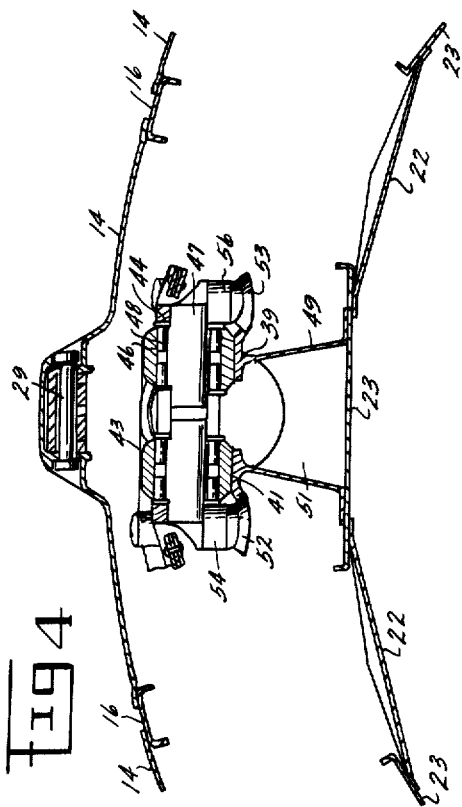

VARIABLE AREA EXHAUST NOZZLE

The invention herein described was made in the course of or under a contract, or a subcontract thereunder, with the United States Department of the Air Force.

BACKGROUND OF THE INVENTION

This invention relates generally to gas turbine engines and, more particularly, to variable exhaust nozzles therefor.

For multimission aircraft applications, the exhaust nozzle operating conditions vary significantly during the mission. In order to maintain high performance over the entire operating range of the aircraft, the exhaust nozzle configuration can become very complex which, in turn, results in increased weight, cost and reliability.

Most current multimission aircraft applications employ engines with convergent-divergent nozzles to meet the system requirements. Characteristically, these nozzles are variable in area at both the nozzle throat (at the downstream end of the convergent nozzle) and at the nozzle exit (at the downstream end of the divergent flap). Ideally, the operation of the nozzle will provide a nozzle throat/exit area ratio schedule which is optimized for the design cycle of the engine. Further, this relationship should provide efficient control at both low subsonic and high supersonic flight conditions while exhibiting low afterbody drag.

One approach has been to design the nozzle so that the area ratio schedule is fixed (e.g., where the convergent and divergent sections are integral). However, it has been found that such an approach tends to limit the flexibility for optimizing the area ratio schedule for the initial cycle, and further limits the flexibility for accommodating changes in cycle and mission requirements which frequently occur during and after development of the system.

Another approach has been to actuate the divergent flap and the convergent flap separately, as by way of separate cams acting on both the inner and outer nozzle flaps. Although such a nozzle has flexibility for optimizing the area ratio schedule and can accommodate changes in cycle and mission requirements, the system offers penalties by way of complexity, weight and cost.

It is therefore an object of the present invention to provide a variable area exhaust nozzle which is suitable for multimission aircraft applications.

Another object of the present invention is the provision for a variable area exhaust nozzle which exhibits a favorable nozzle throat/exit area ratio schedule over an entire engine design cycle.

Still another object of the present invention is the provision in an aircraft engine for a variable area nozzle which is flexible for selection and adjustment of area ratio schedules to match a variety of engine cycles.

Yet another object of the present invention is the provision in a variable area exhaust nozzle for favorable throat/exit area ratios and low afterbody drag during both subsonic and high supersonic flight conditions.

Yet another object of the present invention is the provision of a variable area exhaust nozzle which is simple in operation, light in weight, and economical to manufacture.

These objects and other features and advantages become more readily apparent upon reference to the following description when taken in conjunction with the appended drawings.

SUMMARY OF THE INVENTION

Briefly, in accordance with one aspect of the invention, a nozzle structure is provided to exhibit a throat-/exit area ratio schedule which is substantially optimized for the particular design cycle of the engine, and provision is made to adjust the schedule to accommodate changes in cycle and mission requirements as they occur. This is accomplished by way of a four-bar linkage which comprises, in addition to the convergent and divergent flaps, a rigid link extending from the exhaust duct and a compression link pivotably connecting the rigid link and the divergent flap. Actuation of the system is accomplished by merely rotating the convergent flap, with the divergent flap and compression link rotating accordingly. Rotation of the convergent flap about the exhaust duct is accomplished by way of a cam and roller mechanism.

By another aspect of the invention, the outer flap of the nozzle is connected to the four-bar linkage such that its position will also be varied by movement of the convergent flap. One end of the outer flap is connected to the rigid link and the other end is connected to the downstream end of the divergent flap by way of a pivotable and translatable connection. Variation of the outer flap position with that of the inner flaps thereby provides for a low afterbody drag.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is an exial cross-sectional view of a closed variable exhaust nozzle flap in accordance with the present invention;

FIG. 2 is an axial cross-sectional view of the actuator and seal portions thereof;

FIG. 3 is an axial cross-sectional view thereof in the fully open position;

FIG. 4 is a transverse sectional view thereof as seen along line 4—4 of FIG. 1; and FIG. 5 is a graphic illustration of some possible nozzle area ratio schedules of the present nozzle arrangement.

DESCRIPTION OF THE PREFERRED EMBODIMENT

Referring now to FIGS. 1 and 2, the invention is shown generally at 10 as included in an otherwise somewhat conventional nozzle which is attached to an engine exhaust duct 11 and includes an inner flap 12 with an inner seal 13, and an outer flap 14 with its outer seal 16. For an understanding of how the individual flaps and seals interrelate and operate to form the overall nozzle function, reference may be made to the patent application Ser. No. 814,567, and now, U.S. Pat. No. 4,128,208 entitled "Exhaust Nozzle Flap Seal Arrangement," Edward W. Ryan et al, filed with the present application and assigned to the same assignee. Briefly, the exhaust nozzle assembly includes a plurality of circumferentially spaced nozzle flaps hinged at the downstream end of the exhaust duct 11 to define a symmetrical inner nozzle area which is variable at both the throat 17 and the exit point 18, and a symmetrical outer nozzle which is defined by the outer flap 14. The nozzle areas are varied by way of actuators 21 which are designed to selectively modulate the nozzle flap between the fully closed position as shown in FIG. 1 and the fully open position as shown in FIG. 3. Leakage of exhaust gases between the flaps is prevented by the convergent seals 22 associated with the convergent flaps 23, the divergent seals 24 associated with the divergent flaps 26, and the outer seals 16 which are associated with the outer flaps 14.

The exhaust duct 11 which carries hot exhaust gases from the fan and turbine, includes an exhaust duct liner 27 for cooling the duct walls as is well known in the art. Projecting rearwardly and outwardly from the exhaust duct structure 11 is a rigid link or ring structure 28 which is attached to the exhaust duct 11 by way of welding or the like. Attached to the ring structure 28, at circumferentially spaced positions, are a plurality of outer and inner pivots 29 and 31, respectively. Each pair of outer and inner pivots is adapted to operably receive and mechanically secure a single flap to the exhaust nozzle. At the outer pivot 29, the forward end of the outer flap 14 is rotatably secured by way of suitable means such as a bolt or the like. At the inner pivot 31, the forward end of the convergent flap 23 is pivotably secured. Other connections within the nozzle flap itself include the throat joint 32 between the downstream end of the convergent flaps 23 and the upstream end of the divergent flaps 26, and an exit joint 33 between the downstream end of the divergent flaps 26 and the downstream end of the outer flaps 14. The exit joint 33 includes an elongate slot 34 which allows for translatable relative movement as well as rotational movement between the connected parts. Another linking structure in the flap arrangement is that of the compression link 36 which is attached at its one end to the outer pivot 29 and at its other end to a compression pivot 37 which is located at an intermediate point on the outer structure 38 of the divergent flap 26. The compression link 36 acts to control the movement of the divergent flap 26 and the outer flap 14 in a desired manner as will be described hereinafter.

As will be seen by reference to FIGS. 1 and 3, the outer structure 39 of the convergent flap 23 is reinforced and curved to form a convex cam follower surface 41. By selective movement of a force-exerting element on this cam follower surface, the flaps are caused to move in the desired manner so as to vary the exhaust areas of the nozzle as follows. Referring to FIGS. 1 and 2, the actuator 21 includes a hydraulic piston 42 with its associated bracket 43 on the end thereof for attachment to the actuator ring 44 in a manner well known in the art. The actuators 21 are each supported by a pair of connecting rods 45 which are attached to the ring structure 28 in a manner more clearly shown by the above-referenced patent application. Movement of the hydraulic piston 42 in the fore and aft directions also moves the actuator ring 44 in those directions. As the ring 44 is translated, the cam rollers 46 associated therewith, cause the cam follower surface 41 and its associated convergent flap to move radially which, in turn, allows the divergent flap 26, the outer flap 14, and the compression link 36 to also pivot accordingly.

Referring now to FIG. 4, the cam mechanism is shown in more detail to include the bracket 43 which extends from the hydraulic piston 42, and a pair of spaced cam rollers 46 which are mounted on a common axis 47 by a plurality of roller bearings 48. The cam rollers 46 ride on the cam follower surface 41 of the convergent section outer structure 39. The outer structure 39 includes a pair of spaced struts 49 which define an axial channel 51. In order to prevent the lifting of the cam rollers 46 from the cam follower surface 41, a pair of beveled rollers 52 and 53 extend downwardly from respective posts 54 and 56 such that their beveled surfaces engage the underside of the cam follower surface as shown. In this way, the roller mechanism is prevented from moving upwardly from the cam follower surface 41.

In operation, when the actuator piston 42 is in the retracted or forward position, the actuator ring 44 and cam rollers 46 are in the position as shown in FIG. 1. In this position, the exhaust nozzle flaps are in the fully closed position, and the nozzle throat area (A8) and exit area (A9), associated with points 17 and 18, respectively, are at or near a minimum. As can be seen, the exit area A9 is slightly smaller than that of the throat area A8 to present a converging nozzle configuration. It will be understood that for particular engine cycle requirements, this configuration may be different, e.g., in the fully closed position it may take the form of a convergent/divergent nozzle.

As the hydraulic piston is extended rearwardly, the actuator ring 44 is translated rearwardly and the rollers 46 move rearwardly on the cam follower surface 41. This allows the convergent flap 23 to rotate on the pivot 31 to a more open position. At the same time, the throat joint 32 moves outwardly and the compression pivot 37 is rotated about the outer pivot 29. The position of the exit joint 33, and thus the position of the divergent flap 26, and the outer flap 14 will depend on the characteristics of the linkage system as primarily determined by the compression link 36. That is, depending on the length of the compression link 36 and the position of the compression pivot 37 on the divergent flap outer structure 38, the divergent flap 26 and the outer flap 14 may be made to move in the inward or outward directions in accordance with the preferred schedule. Modification of the length of the compression link 36 or the point at which it connects to the divergent flap outer structure 38 will modify the schedule accordingly. By proper selection of these parameters, one can obtain the desired schedule for a particular engine cycle. Later changes of the cycle then can be accommodated by further changes of these parameters. As can be seen in FIG. 5, the structure can be so modified to obtain any of the representative schedule curves as shown. Although the fundamental shape of the curve is fixed, significant changes in the area ratio schedule can be accomplished relatively easy by adjusting the link length and/or position. The length of the compression link may be adjusted by temporarily disconnecting its one end from the pivot 37 and screwing the shaft 58 in or out of the main body 59 of the compression link 36. A nut 61 is provided to fix the position of the shaft 58 relative to the main body 59.

It will be understood that while the present invention has been described in terms of the preferred embodiment, it may take on any number of other forms while remaining within the scope and intent of the invention.

Having thus described what is considered novel and desired to be secured by Letters Patent of the United States is:

1. In a variable area nozzle of the type having a convergent flap pivotably connected to an exhaust duct and a divergent flap pivotably connected to the convergent flap, a linkage system comprising:
  (a) a first link rigidly attached to the exhaust duct and extending outwardly thereof;
  (b) a second link having one end pivotably attached to said first link and having its other end pivotably attached to the divergent flap; and
  (c) means for rotating the convergent flap about its exhaust duct pivot so as to vary the nozzle area ratio in a predetermined manner.

2. The variable area nozzle as in claim 1 and including an outer flap pivotably attached at its upstream end to said first link and pivotably attached at its downstream end to the divergent flap.

3. The variable area nozzle as in claim 2 wherein said outer flap is attached at the downstream end of the divergent flap.

4. The variable area nozzle as in claim 2 and including translating means between said outer flap attachment with the divergent flap.

5. The variable area nozzle as in claim 1 wherein said second link is attached at a point intermediate the ends of the divergent flap.

6. The variable area nozzle as in claim 1 and including means for varying the length of said second link.

7. A four-bar linkage arrangement for use in a variable area exhaust nozzle extending from an engine exhaust duct comprising:
  (a) a converging nozzle flap having its upstream end pivotably connected to the exhaust duct;
  (b) a diverging nozzle flap pivotably connected to the downstream end of said converging nozzle flap;
  (c) a fixed link rigidly attached to and extending radially outward from the exhaust duct; and
  (d) a compression link pivotably attached at its one end to said fixed link and pivotably attached at its other end to said diverging nozzle flap such that when the convergent flap is rotated about its one end the nozzle area ratio is varied in a predetermined manner.

8. A four-bar linkage arrangement as set forth in claim 7 wherein said converging nozzle flap includes on its radially outer side an arcuate cam follower surface.

9. A four-bar linkage arrangement as set forth in claim 8 wherein said arcuate cam follower surface is convex outwardly.

10. A four-bar linkage arrangement as set forth in claim 7 wherein said fixed link extends rearwardly from the exhaust duct.

11. A four-bar linkage arrangement as set forth in claim 7 wherein said compression link is attached to said diverging nozzle at a point intermediate its upstream and downstream ends.

12. A four-bar linkage arrangement as set forth in claim 7 wherein said compression link includes means for varying its length.

13. A four-bar linkage arrangement as set forth in claim 7 and including an outer flap pivotably attached at its one end to said fixed link and at its other end to said diverging nozzle flap.

14. A four-bar linkage arrangement as set forth in claim 13 wherein the connection between said outer flap and said diverging nozzle flaps includes means for allowing relative translatable motion between the two parts.

* * * * *